United States Patent
Kim et al.

(10) Patent No.: US 9,912,387 B2
(45) Date of Patent: Mar. 6, 2018

(54) DISTRIBUTED ANTENNA SYSTEM INCLUDING CREST FACTOR REDUCTION MODULE DISPOSED AT OPTIMUM POSITION

(71) Applicant: SOLiD, INC., Seongnam-si, Gyeonggi-do (KR)

(72) Inventors: Hyoungho Kim, Seoul (KR); Doyoon Kim, Bucheon-si (KR); Kwangnam Seo, Guri-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/084,749

(22) Filed: Mar. 30, 2016

(65) Prior Publication Data
US 2016/0211891 A1   Jul. 21, 2016

Related U.S. Application Data

(63) Continuation of application No. PCT/KR2015/014538, filed on Dec. 30, 2015.

(30) Foreign Application Priority Data

Dec. 30, 2014 (KR) .................. 10-2014-0194369
Dec. 30, 2014 (KR) .................. 10-2014-0194380
Dec. 30, 2014 (KR) .................. 10-2014-0194381

(51) Int. Cl.
*H04L 27/26* (2006.01)
*H04B 7/022* (2017.01)

(52) U.S. Cl.
CPC ......... *H04B 7/022* (2013.01); *H04L 27/2614* (2013.01); *H04L 27/2624* (2013.01)

(58) Field of Classification Search
CPC . H04W 88/085; H04W 84/047; H04W 88/08; H04B 7/022; H04B 7/024;
(Continued)

(56) References Cited

U.S. PATENT DOCUMENTS 5,659,320 A * 8/1997 Pouit .................. G01S 13/582
                                              342/109
8,817,848 B2 * 8/2014 Lemson ........... H04B 10/25753
                                              370/279
(Continued)

FOREIGN PATENT DOCUMENTS

KR    10-2007-0060279 A    6/2007

OTHER PUBLICATIONS

Hafeth Hourani "RF Distortion Analysis for OFDM WLAN (part I)", Jul. 4, 2004.*
(Continued)

*Primary Examiner* — Sophia Vlahos
(74) *Attorney, Agent, or Firm* — Sughrue Mion, PLLC

(57) ABSTRACT

A distributed antenna system includes a plurality of head-end units for each receiving mobile communication signals from at least one corresponding base station, a hub unit communicatively coupled to the plurality of head-end units, and a plurality of remote units communicatively coupled to the hub unit, wherein the hub unit configured to distribute the mobile communication signals received from each of the plurality of head-end units to the plurality of remote units, wherein each of the plurality of remote units is remotely disposed to transmit the distributed mobile communication signals to a terminal in service coverage, and wherein the hub unit includes a mixing processing stage configured to perform digital mixing processing on the mobile communication signals respectively received from the plurality of head-end units, and a crest factor reduction (CFR) module disposed posterior to the mixing processing stage, with respect to a signal transmission direction.

14 Claims, 7 Drawing Sheets

(58) Field of Classification Search
CPC ............ H04B 7/0413; H04B 10/25753; H04B 10/2575; H04L 27/2614; H04L 27/2615; H04L 27/2618; H04L 27/262; H04L 27/2621; H04L 27/2623; H04L 27/2624; H04L 27/26; H04L 27/2617
See application file for complete search history.

(56) References Cited

U.S. PATENT DOCUMENTS

| | | | | |
|---|---|---|---|---|
| 8,995,502 | B1* | 3/2015 | Lai | H04L 25/00 375/219 |
| 2003/0171105 | A1* | 9/2003 | Dunworth | H03L 7/0898 455/258 |
| 2004/0052314 | A1* | 3/2004 | Copeland | H04B 1/707 375/296 |
| 2005/0190821 | A1* | 9/2005 | Fujii | H04B 7/15535 375/211 |
| 2009/0180426 | A1 | 7/2009 | Sabat et al. | |
| 2010/0278530 | A1* | 11/2010 | Kummetz | H04W 88/085 398/41 |
| 2011/0077017 | A1* | 3/2011 | Yu | H04L 5/0007 455/452.1 |
| 2013/0114761 | A1 | 5/2013 | Azadet et al. | |
| 2013/0129009 | A1* | 5/2013 | Ranson | H04B 7/022 375/295 |
| 2013/0188753 | A1* | 7/2013 | Tarlazzi | H04J 14/0247 375/299 |
| 2014/0079112 | A1* | 3/2014 | Ranson | H04B 7/022 375/240 |
| 2014/0233435 | A1* | 8/2014 | Ko | H04W 88/085 370/277 |
| 2015/0373722 | A1* | 12/2015 | Lange | H04B 7/026 370/315 |

OTHER PUBLICATIONS

International Search Report issued in PCT/2015/014538 dated Dec. 30, 2015.
Written Opinion issued in PCT/KR2015/014538 dated May 4, 2016.

* cited by examiner

[MIXING PROCESSING STAGE IN DIGITAL PART OF HUB OR HEU]

DISTRIBUTED ANTENNA SYSTEM INCLUDING CREST FACTOR REDUCTION MODULE DISPOSED AT OPTIMUM POSITION

CROSS REFERENCE TO RELATED APPLICATIONS

This application is a Continuation of PCT International Application No. PCT/KR2015/014538, filed Dec. 30, 2015, and claims priority from Korean Patent Applications No. 10-2014-0194369, No. 10-2014-0194380 and No. 10-2014-0194381, filed Dec. 30, 2014, the contents of which are incorporated herein by reference in their entireties.

BACKGROUND

1. Field

The inventive concept relates to a distributed antenna system (DAS), and more particularly, to a DAS including a crest factor reduction (CFR) module.

2. Description of Related Art

Crest factor reduction (CFR) is frequently used as a technique for reducing a peak-to-average power ratio (PAPR) of a signal. Particularly, in a system using a digital pre-distorter (DPD), the CFR is implemented at the front end of the DPD.

In a distributed antenna system (DAS), the CFR is generally implemented at the front end of a DPD in a remote unit (RU) among node units constituting the DAS. However, when the number of RUs is large, the complexity and cost for implementing the RUs may increase. Moreover, when it is required to perform multi-band signal processing on the RUs in the DAS, the CFR is required by the number of bands, and therefore, the complexity for implementing the RUs considerably increases.

SUMMARY

An embodiment of the inventive concept is directed to a DAS having at least one CFR module disposed at an optimum position according to a form of each topology or a design form in a distributed antenna system.

According to an aspect of the inventive concept, there is provided a distributed antenna system, comprising: a plurality of head-end units each configured to receive mobile communication signals from at least one corresponding base station; a hub unit communicatively coupled to the plurality of head-end units; and a plurality of remote units communicatively coupled to the hub unit, wherein the hub unit configured to distribute the mobile communication signals received from each of the plurality of head-end units to the plurality of remote units, wherein each of the plurality of remote units is remotely disposed to transmit the distributed mobile communication signals to a terminal in a service coverage, and wherein the hub unit includes a mixing processing stage configured to perform digital mixing processing on the mobile communication signals respectively received from the plurality of head-end units, and a crest factor reduction (CFR) module disposed posterior to the mixing processing stage with respect to a signal transmission direction.

According to an exemplary embodiment, wherein the plurality of head-end units may receive mobile communication signals in at least one mobile communication service band from the at least one corresponding base station, convert the received mobile communication signals into mobile communication signals in a baseband or intermediate frequency (IF) band, perform digital signal conversion on the band-converted mobile communication signals, and transmit the digital-converted mobile communication signals to the hub unit.

According to an exemplary embodiment, wherein the plurality of head-end units may receive different mobile communication signals, wherein the mixing processing stage may include a signal summer configured to digitally sum different mobile communication signals respectively from the plurality of head-end units, and wherein the CFR module may be disposed posterior to the signal summer.

According to an exemplary embodiment, wherein the mixing processing stage may include a signal summer configured to digitally sum signals in the same mobile communication service band among the mobile communication signals respectively received from the plurality of head-end units, and wherein the CFR module may be disposed posterior to the signal summer.

According to an exemplary embodiment, wherein the hub unit may further include a band separator configured to receive mobile communication signals respectively received from the plurality of head-end units and separate signals corresponding to a specific mobile communication service band among the received mobile communication signals.

According to an exemplary embodiment, wherein the signal summer may perform sub-band signal summing on different sub-band signals in the same mobile communication service band among the signals band-separated by the band separator, and digitally re-sum signals for each mobile communication service band, which obtained by performing the sub-band signal summing.

According to an exemplary embodiment, wherein the plurality of head-end units may be communicatively coupled to the at least one corresponding base station to receive signals for each sector in the same mobile communication service band, wherein the mixing processing stage may include a signal swapper configured to perform swapping on the signals for each sector, respectively received from the plurality of head-end units, and wherein the CFR module may be disposed posterior to the signal swapper.

According to another aspect of the inventive concept, there is provided a distributed antenna system, comprising: a head-end unit configured to receive mobile communication signals from a plurality of base stations; and at least one remote unit communicatively coupled to the head-end unit, the at least one remote unit receiving the mobile communication signals from the head-end unit, the at least one remote unit being remotely disposed to transmit the mobile communication signals to a terminal in a service coverage, wherein the head-end unit includes a mixing processing stage configured to perform digital mixing processing on the mobile communication signals respectively received from the plurality of base stations, and a CFR module disposed posterior to the mixing processing stage with respect to a signal transmission direction.

According to an exemplary embodiment, wherein the head-end unit may be configured to receive mobile communication signals in at least one mobile communication service band from the plurality of base stations, convert the received mobile communication signals into mobile communication signals in a baseband or IF band, and perform digital signal conversion on the band-converted mobile communication signals.

According to an exemplary embodiment, wherein the head-end unit may be configured to receive different mobile communication signals from the plurality of base stations, wherein the mixing processing stage may include a signal summer configured to digitally sum the different mobile communication signals received from the plurality of base stations, and wherein the CFR module may be disposed posterior to the signal summer.

According to an exemplary embodiment, wherein the mixing processing stage may include a signal summer configured to digitally sum signals in the same mobile communication service band among the mobile communication signals respectively received from the plurality of base stations, and wherein the CFR module may be disposed posterior to the signal summer.

According to an exemplary embodiment, wherein the head-end unit may further include a band separator configured to receive mobile communication signals respectively transmitted from the plurality of base stations and separate only signals corresponding to a specific mobile communication service band among the received mobile communication signals.

According to an exemplary embodiment, wherein the signal summer may perform sub-band signal summing on different sub-band signals in the same mobile communication service band among the signals band-separated by the band separator, and digitally re-sum signals for each mobile communication service band, which obtained by performing the sub-band signal summing.

According to an exemplary embodiment, wherein the head-end unit may be communicatively coupled to the plurality of base stations to receive signals for each sector in the same mobile communication service band, wherein the mixing processing stage may include a signal swapper configured to perform swapping on the signals for each sector, respectively received from the plurality of base stations, and wherein the CFR module may be disposed posterior to the signal swapper.

According to still another aspect of the inventive concept, there is provided a distributed antenna system, comprising: at least one head-end unit configured to receive mobile communication signals from a plurality of base stations; and at least one remote unit communicatively coupled to the at least one head-end unit, the at least one remote unit receiving the mobile communication signals from the at least one head-end unit, the at least one remote unit being remotely disposed to transmit the mobile communication signals to a terminal in a service coverage, wherein the at least one remote unit includes a signal summer configured to digitally sum the mobile communication signals transmitted from the at least one head-end unit, and a CFR module disposed posterior to the signal summer, with respect to a signal transmission direction.

According to an exemplary embodiment, wherein the at least one remote unit may further include a band separator configured to receive mobile communication signals transmitted from the at least one head-end unit and separate only signals corresponding to a specific mobile communication service band among the received mobile communication signals.

According to an exemplary embodiment, wherein the signal summer may perform digital signal summing on different sub-band signals in the same mobile communication service band among the signals band-separated by the band separator.

According to still another aspect of the inventive concept, there is provided a distributed antenna system, comprising: at least one head-end unit configured to receive mobile communication signals from a plurality of base stations; and at least one remote unit communicatively coupled to the at least one head-end unit, the at least one remote unit receiving the mobile communication signals from the at least one head-end unit, the at least one remote unit being remotely disposed to transmit the mobile communication signals to a terminal in service coverage, wherein the at least one remote unit includes a group delay equalizer configured to perform group delay equalization processing on the mobile communication signals transmitted from the at least one head-end unit, and a CFR module is disposed posterior to the group delay equalizer.

According to embodiments of the inventive concept, it is possible to position crest factor reduction (CFR) at an optimum position according to a form of each topology or a design form in a distributed antenna system.

BRIEF DESCRIPTION OF THE FIGURES

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
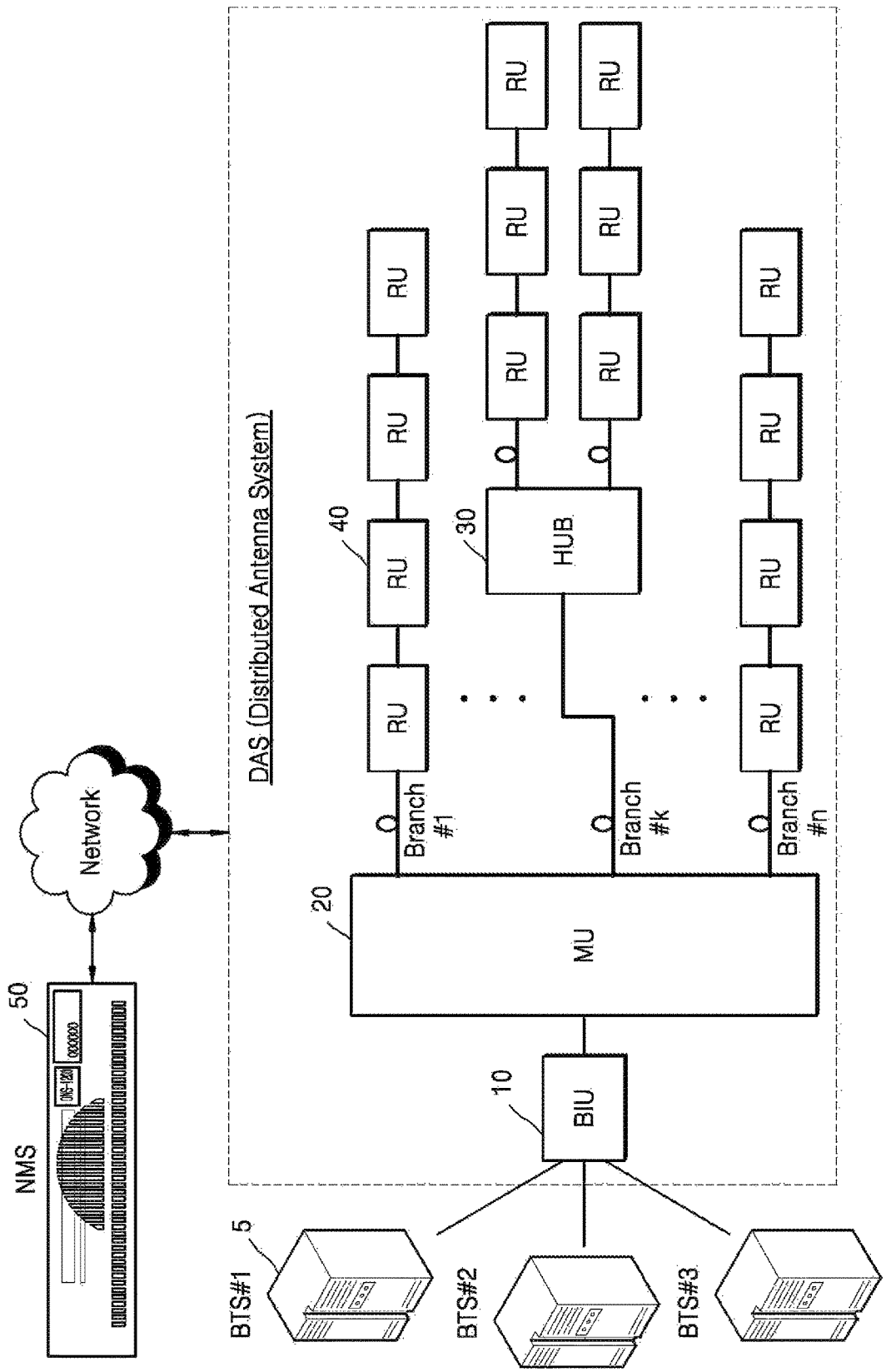
FIG. 1 is a diagram illustrating an example of a topology of a distributed antenna system (DAS) as one form of a signal distributed transmission system to which the inventive concept is applicable.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Throughout the disclosure, like reference numerals refer to like parts throughout the various figures and embodiments of the inventive concept.

In description of the inventive concept, detailed explanation of known related functions and constitutions may be omitted to avoid unnecessarily obscuring the subject manner of the inventive concept. Ordinal numbers (e.g. first, second, etc.) are used for description only, assigned to the elements in no particular order, and shall by no means specify the name of the pertinent element or restrict the claims.

It will be understood that when an element is "connected" or "coupled" to another element, the element may be directly connected or coupled to another element, and there may be an intervening element between the element and another element. To the contrary, it will be understood that when an element is "directly connected" or "directly coupled" to another element, there is no intervening element between the element and another element.

Hereinafter, a distributed antenna system (DAS) will be mainly described as an application example to which embodiments of the inventive concept are applicable. However, the embodiments of the inventive concept are identically or similarly applicable to other signal distributed transmission systems such as a base transceiver station distributed antenna system, as well as the DAS.

FIG. 1 is a diagram illustrating an example of a topology of a DAS as one form of a signal distributed transmission system to which the inventive concept is applicable.

Referring to FIG. 1, the DAS may include a base station interface unit (BIU) 10 and a main unit (MU) 20, which constitute a head-end node of the DAS, a hub unit (HUB) 30 serving as an extension node, and a plurality of remote units (RUs) 40 respectively disposed at remote service positions. The DAS may be implemented as an analog DAS or a digital DAS. When necessary, the DAS may be implemented as a hybrid of the analog DAS and the digital DAS (e.g., to perform analog processing on some nodes and digital processing on the other nodes).

However, FIG. 1 illustrates an example of the topology of the DAS, and the DAS may have various topologies in consideration of particularity of its installation areas and application fields (e.g., in-building, subway, hospital, stadium, etc.). In view of the above, the number of the BIU 10, the MU 20, the HUB 30, and the RUs 40 and connection relations between upper and lower nodes among the BIU 10, the MU 20, the HUB 30, and the RUs 40 may be different from those of FIG. 1. In the DAS, the HUB 30 may be used when the number of branches to be branched in a star structure from the MU 20 is limited as compared with the number of RUs 40 required to be installed. Therefore, the HUB 30 may be omitted when only the single MU 20 sufficiently covers the number of RUs 40 required to be installed, when a plurality of MUs 20 are installed, or the like.

Hereinafter, nodes in the DAS applicable to the inventive concept and their functions will be sequentially described based on the topology of FIG. 1.

The BIU 10 serves as an interface between a base station transceiver system (BTS) 5 and the MU 20. Although a case where a plurality of BTSs 5 are connected to the single BIU 10 is illustrated in FIG. 1, the BIU 10 may be separately provided for each provider, each frequency band, or each sector.

In general, a radio frequency (RF) signal transmitted from the BTS 5 is a signal of high power. Hence, the BIU 10 converts the RF signal of high power into a signal with power suitable to be processed in the MU 20 and transmits the converted signal to the MU 20. According to an embodiment, the BIU 20, as shown in FIG. 1, may receive mobile communication signals for each frequency band (or each provider or each sector), combine the received signals, and then transmit the combined signal to the MU 20.

When the BIU 10 converts mobile communication signals of high power, transmitted from the BTS 5, into mobile communication signals of low power, combines the mobile communication signals, and then transmits the combined mobile communication signal to the MU 20, the MU 20 may distribute the combined and transmitted mobile communication signal (hereinafter, referred to as the relay signal) for each branch. In this case, when the DAS is implemented as the digital DAS, the BIU 10 may be separated into a unit for converting RF signals of high power, transmitted from the BTS 5, into RF signals of low power, and a unit for converting RF signals into intermediate frequency (IF) signals, performing digital signal processing on the converted IF signals, and then combining the processed digital signals. Alternatively, when the BIU 10 performs only the function of converting the relay signals of high power, transmitted from the BTS 5, into the relay signals of low power, the MU 20 may combine the transmitted relay signals and distribute the combined relay signal for each branch.

As described above, the combined relay signal distributed from the MU 20 may be transmitted to the RUs 40 through the HUB 30 or directly transmitted to the RUs 40, for each branch (see Branch #1, . . . , Branch #k, . . . , Branch #N of FIG. 1). Each RU 40 may separate the transmitted combined relay signal for each frequency band and perform signal processing (analog signal processing in the analog DAS and digital signal processing in the digital DAS). Accordingly, each RU 40 can transmit relay signals to user terminals in its own service coverage through a service antenna. Specific components and functions of the RU 40 will be described in detail below with reference to FIG. 2.

In FIG. 1, it is illustrated that the BTS 5 and the BIU 10 are connected through an RF cable, the BIU 10 and the MU 20 are connected through an RF cable, and all nodes from the MU 20 to lower nodes thereof are connected through optical cables. However, a signal transport medium between nodes may be variously modified. As an example, the BIU 10 and the MU 20 may be connected through an RF cable, but may be connected through an optical cable or a digital interface. As another example, the MU 20 and HUB 30 may be connected through an optical cable, the MU 20 and the RU 40 directly connected thereto may be connected through an optical cable, and the cascade-connected RUs 40 may be connected through an RF cable, a twist cable, a UTP cable, etc. As still another example, the MU 20 and the RU 40 directly connected thereto may also be connected through an RF cable, a twist cable, a UTP cable, etc.

Hereinafter, this will be described based on FIG. 1. Therefore, in this embodiment, each of the MU 20, the HUB 30, and the RUs 40 may include an optical transceiver module for electrical-to-optical (E/O) conversion/optical-to-electrical (O/E) conversion. When node units are connected through a single optical cable, each of the MU 20, the HUB 30, and the RUs 40 may include a wavelength division multiplexing (WDM) element. This will be clearly understood through functions of the RU 40 in FIG. 2, which will be described later.

The DAS may be connected to an external management device, e.g., a network management server or system (NMS) 50. Accordingly, a manager can remotely monitor states and problems of the nodes in the DAS through the NMS 50, and can remotely control operations of the nodes in the DAS through the NMS 50.

Figure 2:
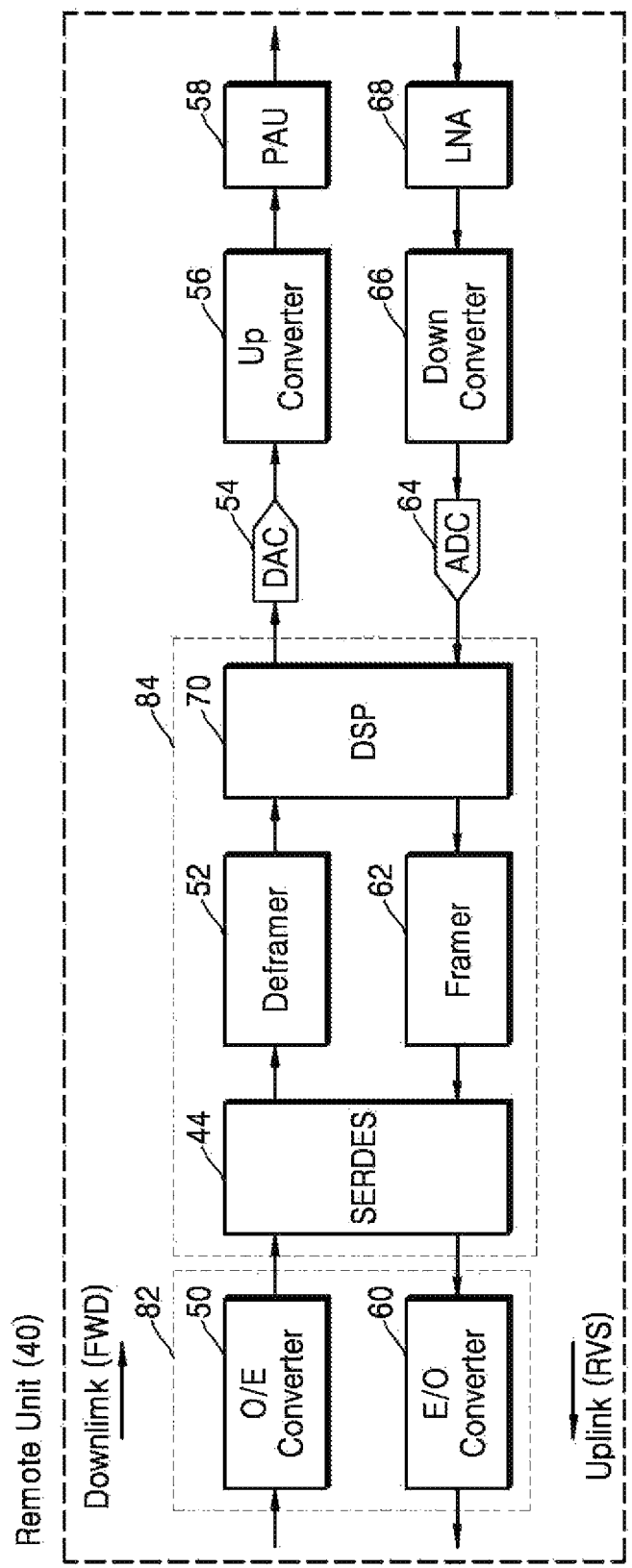
FIG. 2 is a block diagram illustrating an embodiment of a remote unit in the DAS to which the inventive concept is applicable.

FIG. 2 is a block diagram illustrating an embodiment of the RU in the DAS to which the inventive concept is applicable.

Here, the block diagram of FIG. 2 illustrates an embodiment of the RU 40 in the digital DAS in which nodes are connected through an optical cable. In addition, the block diagram of FIG. 2 illustrates only components related to a function of providing service signals to terminals in service coverage through a forward path and processing terminal signals received from the terminals in the service coverage through a reverse path.

Referring to FIG. 2, with respect to a downlink signal transmission path (i.e., a forward path), the RU 40 includes an optical-to-electrical (O/E) converter 50, a serializer/deserializer (SERDES) 44, a deframer 52, a digital signal processor (DSP) 70, a digital-to-analog converter (DAC) 54, an up converter 56, and a power amplification unit (PAU) 58.

In the forward path, an optical relay signal digital-transmitted through an optical cable may be converted into an electrical signal (serial digital signal) by the O/E converter 50. The serial digital signal may be converted into a parallel digital signal by the SERDES 44. The parallel digital signal may be deformatted by the deframer 52 to be processed for each frequency band in the DSP 70. The DSP 70 performs functions including digital signal processing, digital filtering, gain control, digital multiplexing, etc. on relay signals for each frequency band. The digital signal passing through the DSP 70 is converted into an analog signal through the DAC 54 posterior to a digital part 84, based on the signal transmission path. In this case, when the converted analog signal is an IF signal, the analog signal may be frequency up-converted into an analog signal in the original RF band through the up converter 56. The converted analog signal (i.e., the RF signal) in the original RF band is amplified through the PAU 58 to be transmitted through a service antenna (not shown).

With respect to an uplink signal transmission path (i.e., a reverse path), the RU 40 includes a low noise amplifier (LNA) 68, a down converter 66, an analog-to-digital converter ADC 64, the DSP 70, a framer 62, the SERDES 44, and an electrical-to-optical (E/O) converter 60.

In the reverse path, an RF signal (i.e., a terminal signal) received through the service antenna (not shown) from a user terminal (not shown) in a service coverage may be low-noise amplified by the LNA 68. The low-noise amplified signal may be frequency down-converted into an IF signal by the down converter 66. The converted IF signal may be converted into a digital signal by the ADC 64 to be transmitted to the DSP 70. The digital signal passing through the DSP 70 is formatted in a format suitable for digital transmission through the framer 62. The formatted digital signal is converted into a serial digital signal by the SERDES 44. The serial digital signal is converted into an optical digital signal by the E/O converter 60 to be transmitted to an upper node through an optical cable.

Although not clearly shown in FIG. 2, in the state in which the RUs 40 are cascade-connected to each other as illustrated in FIG. 1, the following method may be used when a relay signal transmitted from an upper node is transmitted to a lower adjacent RU cascade-connected to the upper node. For example, when an optical relay signal digital-transmitted from an upper node is transmitted to a lower adjacent RU cascade-connected to the upper node, the optical relay signal digital-transmitted from the upper node may be transmitted to the adjacent RU in an order of the O/E converter 50→the SERDES 44→the deframer 52→the framer 62→the SERDES 44→the E/O converter 60. This will be clearly understood through FIG. 4 which will be described later.

In FIG. 2, the SERDES 44, the deframer 52, the framer 62, and the DSP 70 may be implemented as a field programmable gate array (FPGA). In FIG. 2, it is illustrated that the SERDES 44 and the DSP 70 are commonly used in the downlink and uplink signal transmission paths. However, the SERDES 44 and the DSP 70 may be separately provided for each path. In FIG. 2, it is illustrated that the O/E converter 50 and the E/O converter 60 are provided separately from each other. However, the O/E converter 50 and the E/O converter 60 may be implemented as a single optical transceiver module (e.g., a single small form factor pluggable (SFP) (see reference numeral 82 of FIG. 2)).

In the above, one form of the topology of the DAS and an embodiment of the RU have been described with reference to FIGS. 1 and 2. Particularly, the RU in the digital DAS in which digital signals are transmitted through a transport medium has been mainly described in FIG. 2. However, it will be apparent that the inventive concept may be applied to various application examples.

Hereinafter crest factor reduction (CFR) disposing methods according to various embodiments of the inventive concept will be described with reference to FIGS. 3 to 7.

First Embodiment—CFR Position in HEU(M):HUB(1):RU(N) Topology

According to a first embodiment, in a topology (see a topology of FIG. 3 or 5) of a plurality (M) of head-end units (HEUs), a single HUB, and a plurality (N) of RUs in the DAS, CFR is implemented in the HUB, thereby reducing signal degradation and RU complexity.

Figure 3:
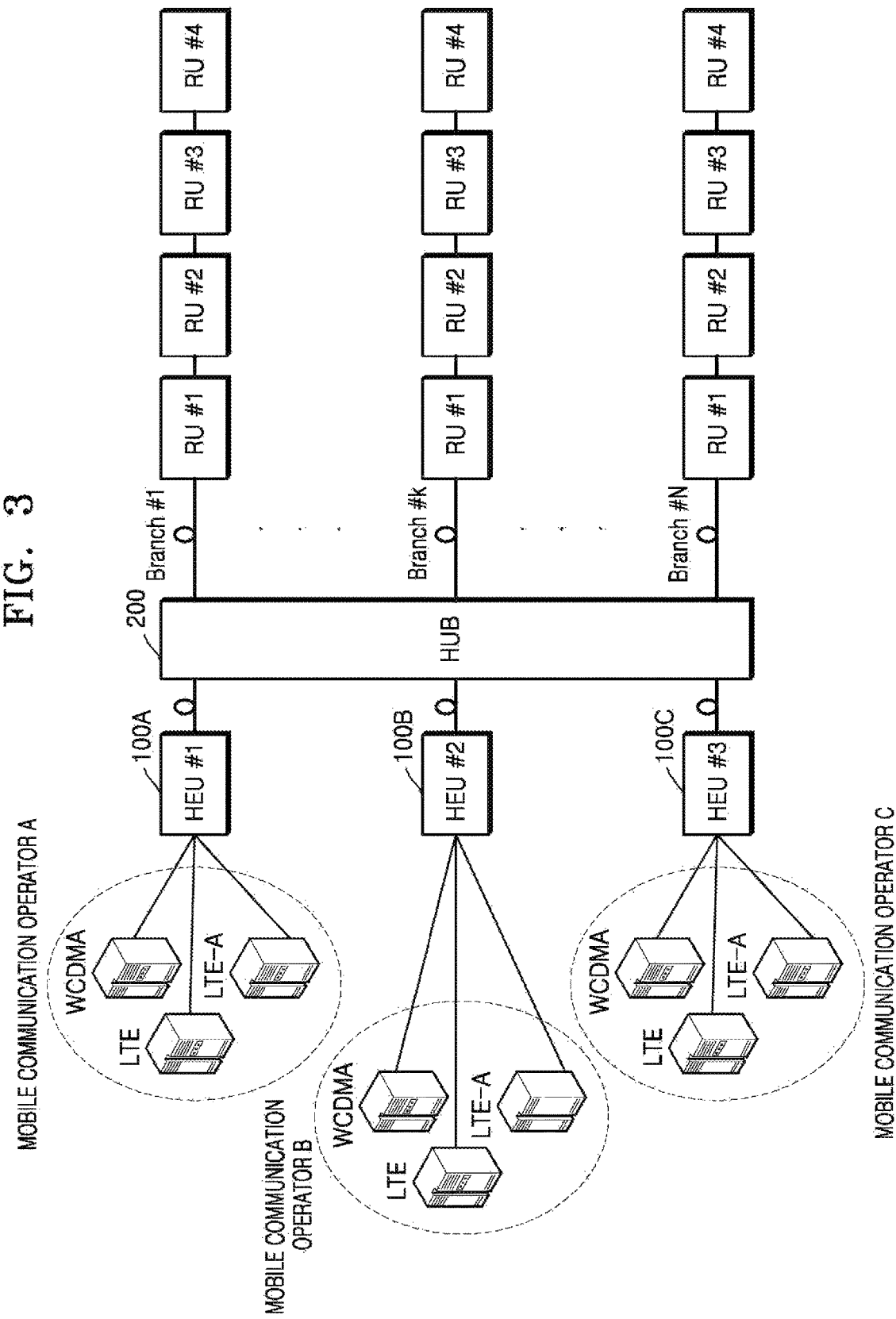
FIG. 3 is a diagram illustrating one form of the topology of the DAS according to an embodiment of the inventive concept.
Figure 5:
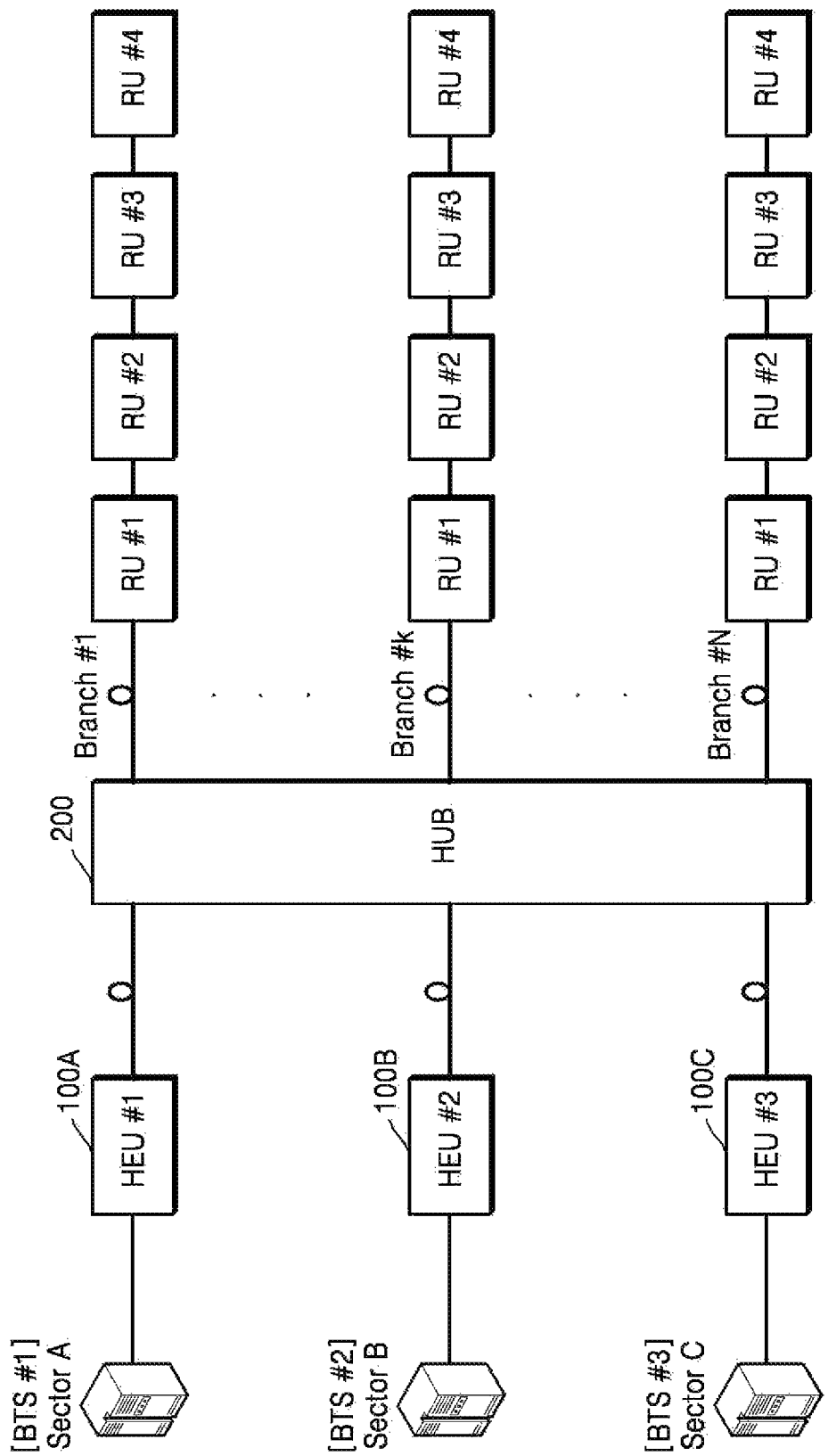
FIG. 5 is a diagram illustrating another form of the topology of the DAS according to an embodiment of the inventive concept.

Referring to FIG. 3 or 5, the DAS includes a plurality of HEUs 100A, 100B, and 100C, a single HUB 200, and a plurality of RUs connected in a star structure or/and a cascade structure to the single HUB 200.

In the topology of FIG. 3 or 5, each of the HEUs 100A, 100B, and 100C may converts mobile communication signals in a plurality of mobile communication service bands, received from a plurality of BTSs, into signals in a baseband or IF band, perform digital signal conversion on the mobile communication signals of which band is converted, and transmit the digital-converted mobile communication signals to the HUB 200.

In the topology of FIG. 3, each of the HEUs 100A, 100B, and 100C receives mobile communication signals in specific mobile communication service bands from a plurality of BTSs through transport mediums. In the embodiment of FIG. 3, it is illustrated that each of the HEUs 100A, 100B, and 100C receives a signal in a WCDMA band, a signal in an LTE band, and a signal in an LTE-A band from three BTSs. In addition, it is assumed that the HEUs 100A, 100B, and 100C receive mobile communication signals of different mobile communication operators, respectively. In FIG. 3, it is assumed that one HEU and one mobile communication operator are matched one by one. However, the inventive concept is not limited thereto. On the other hand, in the topology of FIG. 5, it is illustrated that each of the HEUs 100A, 100B, and 100C receives a signal for each sector in a specific mobile communication service band through a transport medium.

In the HEU(M):HUB(1):RU(N) topology described above, a CFR module (see reference numeral 1040 of FIG. 4 or 6, which will be described later), with respect to a signal transmission direction, may be positioned posterior to a mixing processing stage in the HUB, which perform digital mixing processing on mobile communication signals respectively received from the plurality of HEUs. In the topology, as the CFR module is positioned posterior to the mixing processing stage, signal degradation (i.e., complementary cumulative distribution function (CCDF) degradation) can be minimized.

Hereinafter, CFR disposing methods according to embodiments of the inventive concept will be sequentially described with reference to FIG. 4 based on the topology of FIG. 3 and FIG. 6 based on the topology of FIG. 5.

Figure 4:
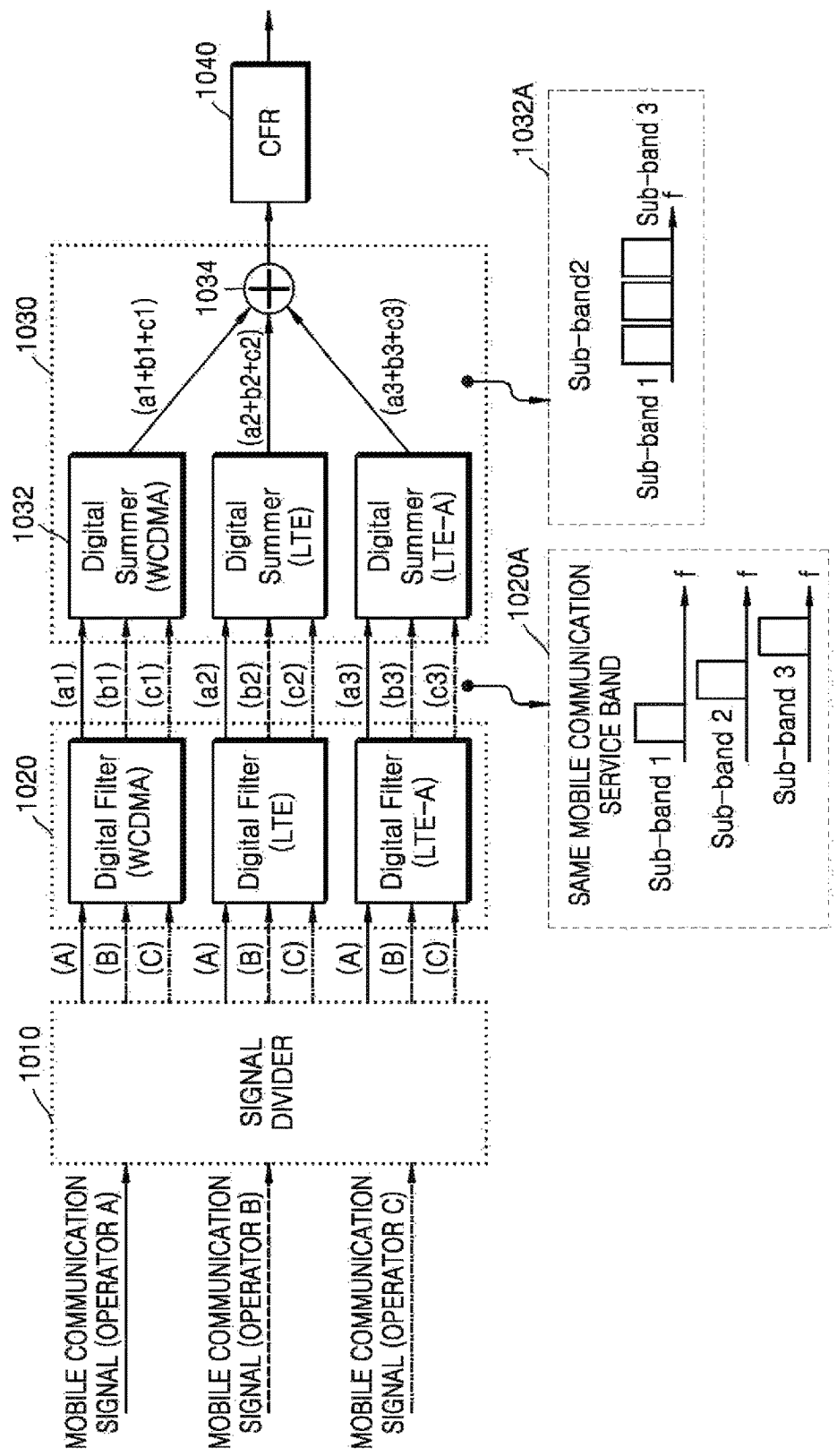
FIG. 4 is a diagram illustrating a crest factor reduction (CFR) disposing method according to an embodiment of the inventive concept.

FIG. 4 is a diagram illustrating components constituting a mixing processing stage related to a CFR disposing method according to an embodiment of the inventive concept in a digital part implemented in a HUB or HEU. However, this is described based on the HEU(M):HUB(1):RU(N) topology of FIG. 3, and therefore, the components of FIG. 4 are implemented in the HUB.

Referring to FIG. 4, the mixing processing stage implemented in the digital part of the HUB 200 may include a signal divider 1010, a band separator 1020, and a signal summer 1030.

The signal divider 1010 divides signals such that mobile communication signals transmitted from each of the HEUs 100A, 100B, and 100C can be input a digital filter for each mobile communication service band in the band separator 1020. For example, it is assumed that mobile communication signals (see reference numeral (A) of FIG. 4) of a mobile communication operator A are input to the HUB 200 from the HEU of reference numeral 100A, mobile communication signals (see reference numeral (B) of FIG. 4) of a mobile communication operator B are input to the HUB 200 from the HEU of reference numeral 100B, and mobile communication signals (see reference numeral (C) of FIG. 4) of a mobile communication operator C are input to the HUB 200 from the HEU of reference numeral 100C. In this case, the signals input to the HUB for each mobile communication operator may include mobile communication signals in the WCDMA band, the LTE band, and the LTE-A band.

The mobile communication signals for each mobile communication operator may be input, through the signal divider 1010, to a digital filter for each service band (see a digital filter for separating the WCDMA band, a digital filter for separating the LTE band, and a digital filter for separating the LTE-A band in FIG. 4).

The band separator 1020 is provided with the digital filter for each service band, to separate only a signal corresponding to the service band. Referring to FIG. 4, the mobile communication signals (A) of the mobile communication operator A, the mobile communication signals (B) of the mobile communication operator B, and the mobile communication signals (C) of the mobile communication operator C are band-separated by the digital filter for each service band. Here, reference numeral (a1) designates a signal in the WCDMA band among the mobile communication signals (A) of the mobile communication operator A, reference numeral (b1) designates a signal in the WCDMA band among the mobile communication signals (B) of the mobile communication operator B, and reference numeral (c1) designates a signal in the WCDMA band among the mobile communication signals (C) of the mobile communication operator C. In the same manner, reference numeral (a2), (b2), or (c2) designate a signal in the LTE band among the mobile communication signals of each mobile communication operator, and reference numeral (a3), (b3), or (c3) designate a signal in the LTE-A band among the mobile communication signals of each mobile communication operator.

As described above, if the signals for each mobile communication operator pass through the band separator 1020, sub-band signals (see Sub-band 1, Sub-band 2, and Sub-band 3) in the same mobile communication service band may be extracted as shown in reference numeral 1020A of FIG. 4. Here, the Sub-band 1 conceptually illustrates a frequency band used by the mobile communication operator A in a process of providing a specific mobile communication service, the Sub-band 2 conceptually illustrates a frequency band used by the mobile communication operator B in a process of providing a specific mobile communication service, and the Sub-band 3 conceptually illustrates a frequency band used by the mobile communication operator C in a process of providing a specific mobile communication service.

Each sub-band signal separated for each of the same communication services band via the band separator 1020 is input to the signal summer 1030. In the embodiment of the inventive concept, the signal summer 1030 primarily digitally sums different sub-band signals in the same communication service band, input via the band separator 1020 (see a component with reference numeral 1032 of FIG. 4), and finally digitally sums the summed signals for the respective communication service bands (see a component with reference numeral 1034).

As described above, a plurality of sub-band signals exist in the same mobile communication service band. In this state, when digital signal summing is performed in the HUB 200, CFR processing is performed after the digital signal summing is performed, thereby minimizing signal degradation. Thus, in FIG. 4, the CFR module 1040 is disposed posterior to the signal summer 1030.

In the above, it is illustrated that the summing of sub-band signals for each of the same mobile communication service bands is performed on forward mobile communication signals respectively received from the plurality of HEUs. In addition, the CFR module may be disposed posterior to a final signal summing stage in various cases of digital signal summing.

Figure 6:
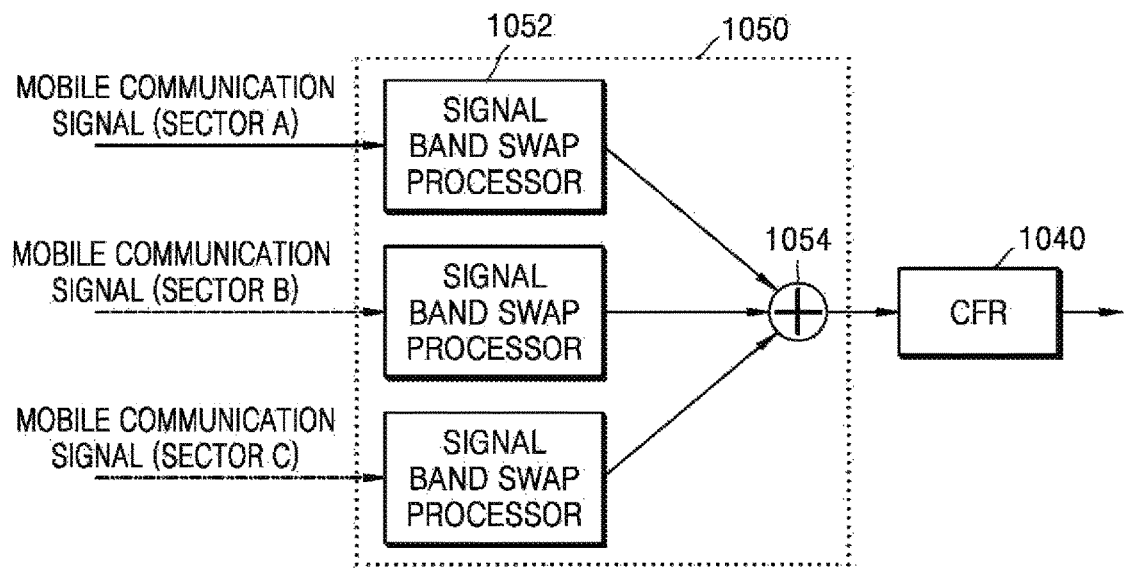
FIG. 6 is a diagram illustrating a CFR disposing method according to another embodiment of the inventive concept.

FIG. 6 is a diagram illustrating components constituting a mixing processing stage related to a CFR disposing method according to another embodiment of the inventive concept in a digital part implemented in a HUB or HEU. However, this is described based on the HEU(M):HUB(1):RU(N) topology of FIG. 5, and therefore, the components of FIG. 6 are implemented in the HUB.

Referring to FIG. 6, the mixing processing stage implemented in the digital part of the HUB 200 may include a signal swapper 1050. In this case, the CFR module 1040 may be disposed posterior to the signal swapper 1050 so as to minimize signal degradation.

When sector swap processing is required in the HUB 200 as a case where the plurality of HEUs 100A, 100B, and 100C receive different sector signals in the same mobile communication service band and transmit the received signals to the HUB 200 as shown in FIG. 5, the CFR module 1040 may be positioned posterior to the signal swapper 1050 that performs the signal swap processing. Referring to FIG. 6, a signal input for each sector (see a sector A, a sector B, and a sector C of FIG. 6) is subjected to swap processing in a frequency band by a signal band swap processor 1052, and the CFR module 1040 is disposed posterior to a component for summing the swap-processed signals (see a component with reference numeral 1054 of FIG. 6).

Second Embodiment—CFR Position in HEU(1):RU(N) or HEU (1):HUB(1):RU(N) Topology

According to a second embodiment, when a topology of a single HEU and a plurality (N) of RUs or a topology of a single HEU, a single HUB, and a plurality (N) of RUs is implemented in the DAS, CFR is implemented in an MU, thereby reducing signal degradation and RU complexity.

In this case, a plurality of base stations or a single/a plurality of operators may be connected to a single HEU, and the signal HEU may be connected, directly or through a single HUB, in a star structure or a cascade structure to N RUs. In this case, when signals are transmitted directly or through the HUB to the N RUs, the HEU may digitally sum mobile communication signals received for each base station and then transmit the summed mobile communication signal. Since the digital signal summing is finally performed in the HEU, the CFR may be implemented in the HEU. Here, the CFR module, as described above, may be disposed posterior to the signal summer (see reference numeral 1030 of FIG. 4). As described with reference to FIG. 6, when sector swapping is required in the HEU, the CFR module may be disposed posterior to the signal swapper (see reference numeral 1050 of FIG. 6).

Third Embodiment—CFR Position in RU

As described above through the aforementioned embodiments, when a plurality of sub-band signals exist in the same mobile communication service band, separation and summing of signals for each band are required. In this case, CFR is performed after signal summing processing is performed, thereby preventing the CCDF degradation.

For example, if final signal summing is performed in an HEU or HUB, the CFR may be implemented in the HEU or HUB. However, signal summing may be performed in an RU when necessary (e.g., due to a decrease in transmission capacity, etc.). Therefore, the CFR may be implemented at the rear end of the signal summer (see reference numeral 1030 of FIG. 4) implemented in a digital part of the RU. This has been described in detail with reference to FIG. 4, and therefore, overlapping description will be omitted.

Figure 7:
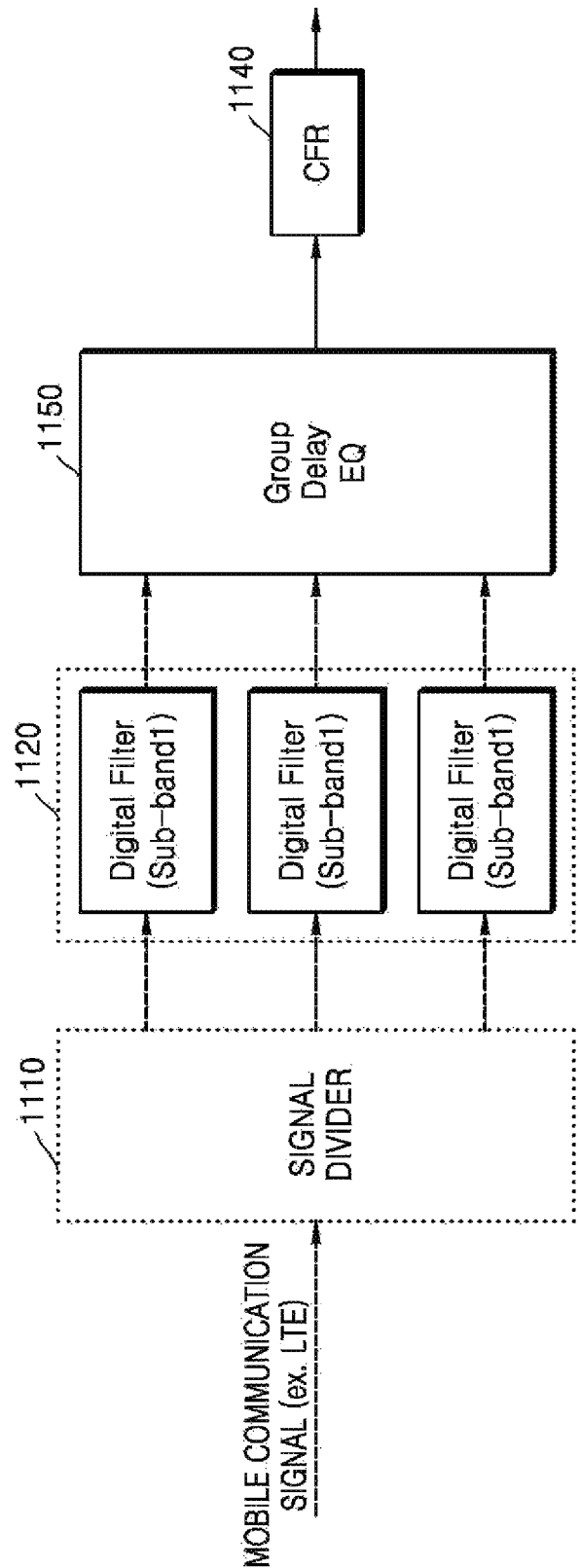
FIG. 7 is a diagram illustrating a CFR disposing method according to still another embodiment of the inventive concept.

In addition, there may exist a case where the CFR is positioned in the RU, thereby minimizing signal degradation. This will be described with reference to FIG. 7. FIG. 7 illustrates a case where a group delay equalization processing function is implemented in the digital part of the RU. The group delay equalization processing function may be used to equalize delays between a plurality of sub-band signals in the same mobile communication service band. For example, in LTE signals using an OFDM scheme, it is important to equalize delays between sub-band signals. To this end, the digital part of the RU may include a signal divider 1110, a sub-band digital filter 1120, and group delay equalizer 1150. In this case, a CFR module 1140, with respect to a signal transmission direction, is disposed posterior to the group delay equalizer 1150 that performs group delay equalization processing on received mobile communication signals, thereby minimizing signal degradation.

Although the inventive concept has been described in connection with the exemplary embodiments, the inventive concept is not limited thereto but defined by the appended claims. Accordingly, it will be understood by those skilled in the art that various modifications and changes can be made thereto without departing from the spirit and scope of the inventive concept defined by the appended claims.

What is claimed is:

1. A distributed antenna system, comprising:
a plurality of head-end devices each configured to receive mobile communication signals from at least one corresponding base station;
a hub communicatively coupled to the plurality of head-end devices and separated from the plurality of head-end devices; and
a plurality of remote unit devices communicatively coupled to the hub,
wherein the hub is configured to distribute the mobile communication signals received from each of the plurality of head-end devices to the plurality of remote unit devices,
wherein each of the plurality of remote unit devices is remotely disposed to transmit the distributed mobile communication signals to a terminal in a service coverage, and wherein the hub includes at least one processor to implement:
a mixing processing unit configured to perform digital mixing processing on the mobile communication signals respectively received from the plurality of head-end devices, and
a crest factor reduction (CFR) module that is disposed posterior to the mixing processing unit with respect to a downlink direction and performs CFR processing on the processed signals output from the mixing processing unit.

2. The distributed antenna system of claim 1, wherein the plurality of head-end devices receive mobile communication signals in at least one mobile communication service band from the at least one corresponding base station, convert the received mobile communication signals into mobile communication signals in a baseband or intermediate frequency (IF) band, perform digital signal conversion on the band-converted mobile communication signals, and transmit the digital-converted mobile communication signals to the hub.

3. The distributed antenna system of claim 2, wherein the plurality of head-end devices receive different mobile communication signals,
wherein the mixing processing unit includes a signal summer configured to digitally sum different mobile communication signals respectively from the plurality of head-end devices, and
wherein the CFR module is disposed posterior to the signal summer.

4. The distributed antenna system of claim 2, wherein the mixing processing unit includes a signal summer configured to digitally sum signals in the same mobile communication service band among the mobile communication signals respectively received from the plurality of head-end devices, and
wherein the CFR module is disposed posterior to the signal summer.

5. The distributed antenna system of claim 4, wherein the hub further includes a band separator configured to receive mobile communication signals respectively received from the plurality of head-end devices and separate signals corresponding to a specific mobile communication service band among the received mobile communication signals.

6. The distributed antenna system of claim 5, wherein the signal summer performs sub-band signal summing on different sub-band signals in the same mobile communication service band among the signals band-separated by the band separator, and digitally re-sum signals for each mobile communication service band, which obtained by performing the sub-band signal summing.

7. The distributed antenna system of claim 2, wherein the plurality of head-end devices are communicatively coupled to the at least one corresponding base station to receive signals for each sector in the same mobile communication service band,
wherein the mixing processing unit includes a signal swapper configured to perform swapping on the signals for each sector, respectively received from the plurality of head-end devices, and
wherein the CFR module is disposed posterior to the signal swapper.

8. A distributed antenna system, comprising:
a head-end device configured to receive mobile communication signals from a plurality of base stations; and
at least one remote unit device communicatively coupled to the head-end device, the at least one remote unit device receiving the mobile communication signals from the head-end device, the at least one remote unit device being remotely disposed to transmit the mobile communication signals to a terminal in service coverage, wherein the head-end device includes at least one processor to implement:

a mixing processing unit configured to perform digital mixing processing on the mobile communication signals respectively received from the plurality of base stations, and a crest factor reduction (CFR) module that is disposed posterior to the mixing processing unit with respect to a downlink direction and performs CFR processing on the processed signals output from the mixing processing unit, and wherein the head-end device includes a band separator configured to receive the mobile communication signals respectively transmitted from the plurality of base stations and separate only signals corresponding to a specific mobile communication service band among the received mobile communication signals.

9. The distributed antenna system of claim 8, wherein the head-end device is configured to receive the mobile communication signals in at least one mobile communication service band from the plurality of base stations, convert the received mobile communication signals into mobile communication signals in a baseband or IF band, and perform digital signal conversion on the band-converted mobile communication signals.

10. The distributed antenna system of claim 9, wherein the head-end device is configured to receive different mobile communication signals from the plurality of base stations, wherein the mixing processing unit includes a signal summer configured to digitally sum the different mobile communication signals received from the plurality of base stations, and wherein the CFR module is disposed posterior to the signal summer.

11. The distributed antenna system of claim 9, wherein the mixing processing unit includes a signal summer configured to digitally sum signals in the same mobile communication service band among the mobile communication signals respectively received from the plurality of base stations, and wherein the CFR module is disposed posterior to the signal summer.

12. The distributed antenna system of claim 11, wherein the signal summer performs sub-band signal summing on different sub-band signals in the same mobile communication service band among the signals band-separated by the band separator, and digitally re-sum signals for each mobile communication service band, which obtained by performing the sub-band signal summing.

13. The distributed antenna system of claim 9, wherein the head-end device is communicatively coupled to the plurality of base stations to receive signals for each sector in the same mobile communication service band, wherein the mixing processing unit includes a signal swapper configured to perform swapping on the signals for each sector, respectively received from the plurality of base stations, and wherein the CFR module is disposed posterior to the signal swapper.

14. A distributed antenna system, comprising:

at least one head-end device configured to receive mobile communication signals from a plurality of base stations; and at least one remote unit device communicatively coupled to the at least one head-end device, the at least one remote unit device receiving the mobile communication signals from the at least one head-end device, the at least one remote unit device being remotely disposed to transmit the mobile communication signals to a terminal in a service coverage, wherein the at least one remote unit device includes a signal summer configured to digitally sum the mobile communication signals received from the at least one head-end device, and a CFR module disposed posterior to the signal summer, with respect to a downlink direction, wherein the at least one remote unit device further includes a band separator configured to receive mobile communication signals received from the at least one head-end device and separate only signals corresponding to a specific mobile communication service band among the received mobile communication signals, and wherein the signal summer performs digital signal summing on different sub-band signals in a same mobile communication service band among the signals band-separated by the band separator.

\* \* \* \* \*